(12) United States Patent
Liu et al.

(10) Patent No.: US 12,136,877 B2
(45) Date of Patent: Nov. 5, 2024

(54) SWITCHED CAPACITOR VOLTAGE CONVERTER CIRCUIT AND SWITCHED CAPACITOR VOLTAGE CONVERSION METHOD

(71) Applicant: Richtek Technology Corporation, Zhubei (TW)

(72) Inventors: Kuo-Chi Liu, Hsinchu (TW); Ta-Yung Yang, Taoyuan (TW); Wei-Hsu Chang, Hsinchu (TW)

(73) Assignee: RICHTEK TECHNOLPGY CORPORATION, Zhubei (TW)

( * ) Notice: Subject to any disclaimer, the term of this patent is extended or adjusted under 35 U.S.C. 154(b) by 187 days.

(21) Appl. No.: 18/149,112

(22) Filed: Jan. 1, 2023

(65) Prior Publication Data
US 2023/0246548 A1 Aug. 3, 2023

Related U.S. Application Data

(60) Provisional application No. 63/304,167, filed on Jan. 28, 2022.

(30) Foreign Application Priority Data

Jul. 22, 2022 (TW) .................................. 111127629

(51) Int. Cl.
*H02M 3/07* (2006.01)
*H02M 1/00* (2006.01)
*H02M 1/08* (2006.01)

(52) U.S. Cl.
CPC ........... *H02M 3/07* (2013.01); *H02M 1/0009* (2021.05); *H02M 1/08* (2013.01)

(58) Field of Classification Search
CPC ...... H02M 3/07; H02M 1/0009; H02M 3/015; H02M 1/0095; H02M 1/10; H02M 1/0058; H02M 3/158; Y02B 70/10
See application file for complete search history.

(56) References Cited

U.S. PATENT DOCUMENTS

| | | | |
|---|---|---|---|
| 8,351,228 B2 * | 1/2013 | Izumi ..................... | H02M 3/07 363/60 |
| 9,667,139 B2 * | 5/2017 | Giuliano ............... | H02M 3/158 |
| 9,917,517 B1 * | 3/2018 | Jiang ...................... | H02M 1/34 |
| 10,063,146 B1 * | 8/2018 | Lee ....................... | G01R 19/003 |
| 10,340,794 B1 * | 7/2019 | Zhang ................... | H02M 3/158 |
| 10,418,907 B1 * | 9/2019 | Xi ......................... | H02M 3/158 |
| 10,554,124 B1 * | 2/2020 | Mangudi ................ | H02M 1/08 |
| 10,651,731 B1 * | 5/2020 | Rainer ................. | H02M 3/1588 |

(Continued)

*Primary Examiner* — Yusef A Ahmed
(74) *Attorney, Agent, or Firm* — Tung & Associates

(57) ABSTRACT

A switched capacitor voltage converter circuit for converting a first voltage to a second voltage, includes: a switched capacitor converter and a control circuit. The switched capacitor converter includes at least two capacitors, plural switches and at least one inductor. In a mode switching period wherein the switched capacitor converter switches from a present conversion mode to a next conversion mode, at least two forward switches of the plural switches operate in a unidirectional conduction mode. Each of the forward switches provides a current channel that unidirectionally flows toward the second voltage in the unidirectional conduction mode. The switched capacitor voltage converter circuit is also operable to convert the second voltage to the first voltage.

17 Claims, 10 Drawing Sheets

(56) References Cited

U.S. PATENT DOCUMENTS

| | | | |
|---|---|---|---|
| 11,165,335 B2 * | 11/2021 | Sblano | H02M 3/1584 |
| 2002/0054499 A1 * | 5/2002 | Tanaka | H02M 7/4826 |
| | | | 363/132 |
| 2008/0211475 A1 * | 9/2008 | Ishii | H02M 3/156 |
| | | | 323/285 |
| 2011/0175591 A1 * | 7/2011 | Cuk | H02M 3/158 |
| | | | 323/311 |
| 2017/0302093 A1 * | 10/2017 | Petersen | H02M 3/158 |
| 2018/0048233 A1 * | 2/2018 | Ramachandran | H02M 3/158 |
| 2019/0028025 A1 * | 1/2019 | Babazadeh | H01L 27/088 |
| 2019/0319526 A1 * | 10/2019 | Yang | H02M 3/155 |
| 2020/0177081 A1 * | 6/2020 | Huang | H02M 3/07 |
| 2020/0204071 A1 * | 6/2020 | Huang | H02M 3/07 |
| 2021/0328507 A1 * | 10/2021 | Liu | H02M 1/0095 |
| 2021/0351695 A1 * | 11/2021 | Liu | H02M 3/155 |
| 2021/0367511 A1 * | 11/2021 | Liu | H02M 3/01 |
| 2021/0367520 A1 * | 11/2021 | Liu | H02M 3/158 |
| 2021/0376717 A1 * | 12/2021 | Liu | H02M 3/01 |
| 2021/0384820 A1 * | 12/2021 | Liu | H02M 1/007 |
| 2021/0399621 A1 * | 12/2021 | Liu | H02M 3/01 |
| 2022/0029531 A1 * | 1/2022 | Liu | H02M 3/01 |
| 2022/0140726 A1 * | 5/2022 | Liu | H02M 1/0095 |
| | | | 323/271 |
| 2022/0352816 A1 * | 11/2022 | Liu | H02M 3/07 |
| 2022/0368218 A1 * | 11/2022 | Liu | H02M 3/01 |
| 2023/0028873 A1 * | 1/2023 | Liu | H02M 3/07 |
| 2023/0170795 A1 * | 6/2023 | Yoo | H02M 1/08 |
| | | | 323/271 |
| 2023/0223843 A1 * | 7/2023 | Liu | H02M 1/083 |
| | | | 363/21.02 |
| 2023/0238883 A1 * | 7/2023 | Hsieh | H02M 1/0025 |
| | | | 323/282 |
| 2023/0246548 A1 * | 8/2023 | Liu | H02M 3/07 |
| | | | 323/271 |
| 2023/0361674 A1 * | 11/2023 | Liu | H02M 3/158 |
| 2023/0396162 A1 * | 12/2023 | Liu | H02M 1/0095 |
| 2023/0412073 A1 * | 12/2023 | Ge | H02M 3/077 |
| 2024/0072633 A1 * | 2/2024 | Liu | H02M 3/07 |

* cited by examiner

| Mode Switching | 2nd Conversion Mode to 1st Conversion Mode (alternating discharge) | 1st Conversion Mode (alternating discharge) to 2nd Conversion Mode |
|---|---|---|
| Voltage Conversion Ratio | 2:1 to 3:1 | 3:1 to 2:1 |
| GA' Control SW. | Q1 | Q1, Q6 |
| GB' Control SW. | Q4 | Q4 |
| GC' Control SW. | Q6 | |
| GD' Control SW. | Q2, Q3, Q5, Q7 | Q2, Q3, Q5, Q7 |

| Mode Switching | 2nd Conversion Mode to 1st Conversion Mode (simultaneous discharge) | 1st Conversion Mode (simultaneous discharge) to 2nd Conversion Mode |
|---|---|---|
| Voltage Conversion Ratio | 2:1 to 3:1 | 3:1 to 2:1 |
| GA' Control SW. | Q1 | Q1, Q6 |
| GB' Control SW. | Q4, Q6 | Q4 |
| GD' Control SW. | Q2, Q3, Q5, Q7 | Q2, Q3, Q5, Q7 |

SWITCHED CAPACITOR VOLTAGE CONVERTER CIRCUIT AND SWITCHED CAPACITOR VOLTAGE CONVERSION METHOD

CROSS REFERENCE

The present invention claims priority to U.S. 63/304,167 filed on Jan. 28, 2022 and claims priority to TW 111127629 filed on Jul. 22, 2022.

BACKGROUND OF THE INVENTION

Field of Invention

The present invention relates to a switched capacitor voltage converter circuit, and in particular, to a switched capacitor voltage converter circuit and a switched capacitor voltage conversion method that can reduce inrush current during a mode switching period.

Description of Related Art

FIG. 1 shows a conventional resonant switched capacitor voltage converter 10. The conventional resonant switched capacitor voltage converter 10 can operate in high efficiency when its switches operate at resonant frequency and switch in a soft switching state, namely zero current switching and/or zero voltage switching. However, the conventional resonant switched capacitor voltage converter 10 only has a fixed input-to-output conversion ratio, that is, the input voltage Vin to the output voltage Vout is fixed at 2-to-1.

In view of the above, to overcome the drawback in the prior art, the present invention proposes an innovative switched capacitor voltage converter circuit

SUMMARY OF THE INVENTION

From one perspective, the present invention provides a switched capacitor voltage converter circuit configured to convert a first voltage into a second voltage, the switched capacitor voltage converter circuit comprising: a switched capacitor converter, coupled between the first voltage and the second voltage; and a control circuit, configured to determine the switched capacitor converter to operate in a conversion mode having a voltage conversion ratio, and configured to generate control signals according to the conversion mode to control the switched capacitor converter to convert the first voltage into the second voltage; wherein the switched capacitor converter comprises: at least two capacitors; a plurality of switches, coupled with the at least two capacitors; and at least one inductor; wherein the control signals comprise a charge operating signal and at least one discharge operating signal to control the plurality of switches to convert the first voltage into the second voltage; wherein during a charge process of the conversion mode, the charge operating signal controls the plurality of switches, so that at least one of the capacitors and the inductor are connected in series between the first voltage and the second voltage to form a charging path and operate in resonant operation; wherein during at least one discharge process of the conversion mode, the discharge operating signal controls the plurality of switches, so that the capacitor and the inductor are connected in series between the second voltage and a direct-current (DC) potential, to simultaneously or alternately form a plurality of discharging paths and operate in resonant operation; wherein in the conversion mode, the charge process and the at least one discharge process are performed repeatedly and alternately, so as to convert the first voltage into the second voltage; wherein in the conversion mode, the charge operating signal and the at least one discharge operating signal have respective conduction periods which do not overlap with each other, so that the charge process and the at least one discharge process do not overlap with each other; wherein during a mode switching period wherein the control circuit is switched from a present conversion mode to a next conversion mode, the control signals are changed to a mode switching control signal, which comprises a mode-switching charge signal, at least one mode-switching discharge signal, and a unidirectional conduction signal; wherein the unidirectional conduction signal is configured to control at least two forward switches of the plurality of switches to operate in a unidirectional conduction mode, wherein during the unidirectional conduction mode, each of the forward switches provides a current channel unidirectionally toward the second voltage; and wherein the mode-switching charge signal and the mode-switching discharge signal control the switches other than the at least two forward switches operating in the unidirectional conduction mode, so as to convert the first voltage into the second voltage.

From another perspective, the present invention provides a switched capacitor voltage conversion method configured to convert a first voltage of a switched capacitor converter into a second voltage, the switched capacitor converter comprising at least two capacitors, a plurality of switches, and at least one inductor, the switched capacitor voltage conversion method comprising: determining the switched capacitor converter to operate in a conversion mode having a voltage conversion ratio, and generating control signals according to the conversion mode to control the plurality of switches of the switched capacitor converter to convert the first voltage into the second voltage, wherein the control signals comprise a charge operating signal and at least one discharge operating signal; wherein during a charge process of the conversion mode, the charge operating signal controls the plurality of switches, so that at least one of the capacitors and the inductor are connected in series between the first voltage and the second voltage to form a charging path and operate in resonant operation; wherein during at least one discharge process of the conversion mode, the discharge operating signal controls the plurality of switches, so that the capacitor and the inductor are connected in series between the second voltage and a direct-current (DC) potential, to simultaneously or alternately form a plurality of discharging paths and operate in resonant operation; wherein in the conversion mode, the charge process and the at least one discharge process are performed repeatedly and alternately, so as to convert the first voltage into the second voltage; wherein in the conversion mode, the charge operating signal and the at least one discharge operating signal have respective conduction periods which do not overlap with each other, so that the charge process and the at least one discharge process do not overlap with each other; wherein during a mode switching period between switching a present conversion mode to a next conversion mode, the control signals are changed to a mode switching control signal, which comprises a mode-switching charge signal, at least one mode-switching discharge signal, and a unidirectional conduction signal; wherein the unidirectional conduction signal is configured to control at least two forward switches of the plurality of switches to operate in a unidirectional conduction mode, wherein during the unidirectional conduction mode, each of the forward switches provides a current channel unidirectionally toward the second voltage; and wherein the mode-switching charge signal and the mode-switching discharge signal control the switches other than the at least two forward switches operating in the unidirectional conduction mode, so as to convert the first voltage into the second voltage.

In one embodiment, the at least two forward switches operating in the unidirectional conduction mode are either always turned on, or always turned off but having body diodes providing the current channel unidirectionally toward the second voltage.

In one embodiment, during the mode switching period, a duty cycle of the mode-switching charge signal and/or the mode-switching discharge signal is correspondingly less than a duty cycle of a previous charge operating signal and/or a previous discharge operating signal, and the duty cycle of the mode-switching charge signal and/or the mode-switching discharge signal gradually increases from a preset value, so that a capacitor voltage across the corresponding capacitor gradually increases or decreases during the mode switching period.

In one embodiment, the control circuit comprises: a duty cycle determination circuit, configured to compare a ramp-up voltage of a ramp-up node with a periodic waveform signal to generate a duty cycle signal; a duty cycle distribution circuit, configured to respectively generate the mode-switching charge signal and the at least one mode-switching discharge signal according to the duty cycle signal; and a ramp-up voltage generating circuit, coupled to the duty cycle determination circuit, configured to generate the ramp-up voltage of the ramp-up node during the mode switching period; wherein the ramp-up voltage of the ramp-up node gradually increases during the mode switching period, so that the duty cycle of the mode-switching charge signal and the at least one mode-switching discharge signal gradually increases correspondingly.

In one embodiment, the switched capacitor converter comprises a series-parallel switched capacitor converter.

In one embodiment, the DC potential is a ground potential.

In one embodiment, the control circuit comprises: a current sensing circuit, configured to sense a current flowing through the at least one inductor to generate at least one current sensing signal; and a control signal generating circuit, coupled to the current sensing circuit to generate the control signals according to the current sensing signal.

In one embodiment, the control circuit further comprises a voltage sensing circuit for sensing the second voltage to generate a voltage sensing signal.

In one embodiment, during the mode switching period, the control circuit reduces the duty cycle of the mode-switching charge signal and/or the mode-switching discharge signal to a preset value to limit an inductor current flowing through the inductor.

In one embodiment, the conversion mode comprises a first conversion mode and a second conversion mode, wherein after the control circuit reduces the duty cycle of the mode-switching charge signal and/or the mode-switching discharge signal to the preset value, the control circuit gradually increases the duty cycle of the mode-switching charging signal and/or the mode-switching discharging signal until a switching cycle period of the mode-switching charging signal and/or the mode-switching discharging signal corresponds to a resonant frequency of the switched capacitor converter in the first conversion mode or the second conversion mode.

In one embodiment, the conversion mode comprises a first conversion mode and a second conversion mode, and during the mode switching period, when the second voltage reaches a preset voltage of the second conversion mode or the first conversion mode for a preset period, the at least two forward switches providing a current channel unidirectionally toward the second voltage are changed to be controlled by the charge operating signal and/or the discharge operating signal.

In one embodiment, the switched capacitor voltage converter circuit has a bidirectional conversion function whereby the switched capacitor voltage converter circuit is also operable to convert the second voltage into the first voltage.

Advantages of the present invention include: that, during mode switching period, by reducing the duty cycle to a preset value and gradually increasing the duty cycle, and the freewheeling of the inductor current during mode switching period, the inrush current generated during mode switching period can be effectively reduced; that, more operating modes with different voltage conversion ratios can be provided; that, the switching current can be limited during mode switching period; and that, during mode switching period, it is not required to stop or reset the switched capacitor converter.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
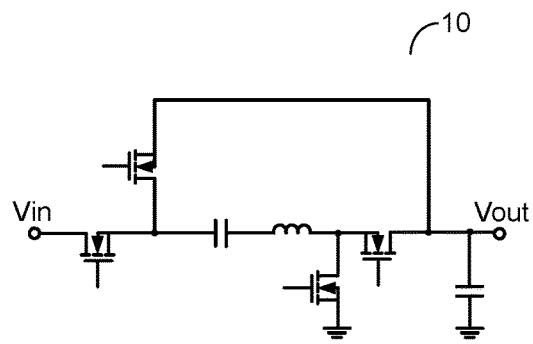
FIG. 1 shows a schematic diagram of a conventional resonant switched capacitor voltage converter.
Figure 2A:
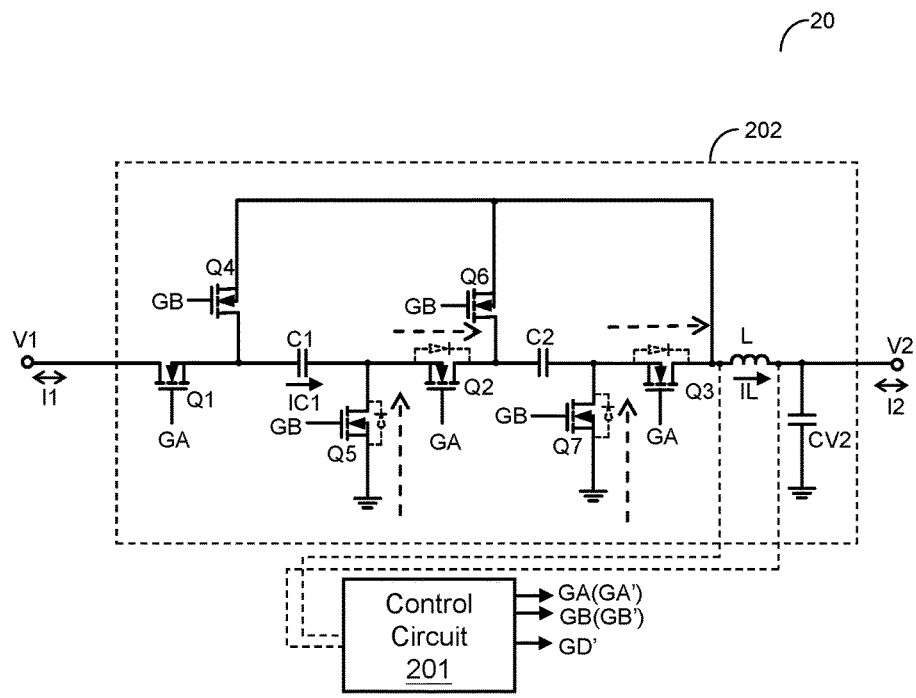
FIG. 2A shows a schematic circuit diagram of a switched capacitor voltage converter circuit according to an embodiment of the present invention.

Please refer to FIG. 2A, which shows a schematic circuit diagram of a switched capacitor voltage converter circuit according to an embodiment of the present invention. As shown in FIG. 2A, the switched capacitor voltage converter circuit 20 is configured to operably convert a first voltage V1 to a second voltage V2 or convert the second voltage V2 to the first voltage V1. The switched capacitor voltage converter circuit 20 includes: a control circuit 201 and a switched capacitor converter 202. The switched capacitor converter 202 is coupled between the first voltage V1 and the second voltage V2. The control circuit 201 is configured to operably determine a conversion mode according to a voltage conversion ratio, so as to generate a control signal for controlling the switched capacitor converter 202 to convert the first voltage V1 to the second voltage V2 or to convert the second voltage V2 to the first voltage V1. The aforementioned voltage conversion ratio is a ratio of the first voltage V1 and the second voltage V2.

In the present embodiment, the control signals include a charge operating signal GA and at least one discharge operating signal GB, and the charge operating signal GA or the discharge operating signal GB control controls plural switches Q1-Q7 so that the switched capacitor converter 202 operates in a first conversion mode of simultaneous discharging, a first conversion mode of alternating discharging, or a second conversion mode. In the present embodiment, the switched capacitor converter 202 operates in the first conversion mode of simultaneous discharging, wherein a ratio of the first voltage V1 to the second voltage V2 is 3:1, and the discharging paths are connected in parallel to discharge simultaneously in the discharge process. The switched capacitor converter 202 includes at least two capacitors C1 and C2, plural switches Q1-Q7, and at least one inductor L. The plural switches Q1-Q7 are coupled to the at least two capacitors C1 and C2.

In the charge process of the first conversion mode of simultaneous discharging, the charge operating signal GA controls the switches Q1, Q2, and Q3, so that the capacitors C1 and C2 and the inductor L are connected in series between the first voltage V1 and the second voltage V2 to form a charging path and operate in resonant operation. During at least one discharge process of the first conversion mode of simultaneous discharging, the discharge operating signal GB controls the switches Q4-Q7, so that each of the capacitors C1 and C2 is connected in series with the inductor L between the second voltage V2 and a direct-current (DC) potential (in the present embodiment, the DC potential is the ground potential), thereby simultaneously forming plural discharging paths and operating in resonant operation. In the first conversion mode of simultaneous discharging, the charge process and the at least one discharge process are performed repeatedly and alternately, to convert the first voltage V1 into the second voltage V2 or to convert the second voltage V2 to the first voltage V1. In the first conversion mode of simultaneous discharging, the charge operating signal GA and the at least one discharge operating signal GB have respective conduction periods which do not overlap with each other, so that the charge process and the at least one discharge process do not overlap with each other.

Figure 2B:
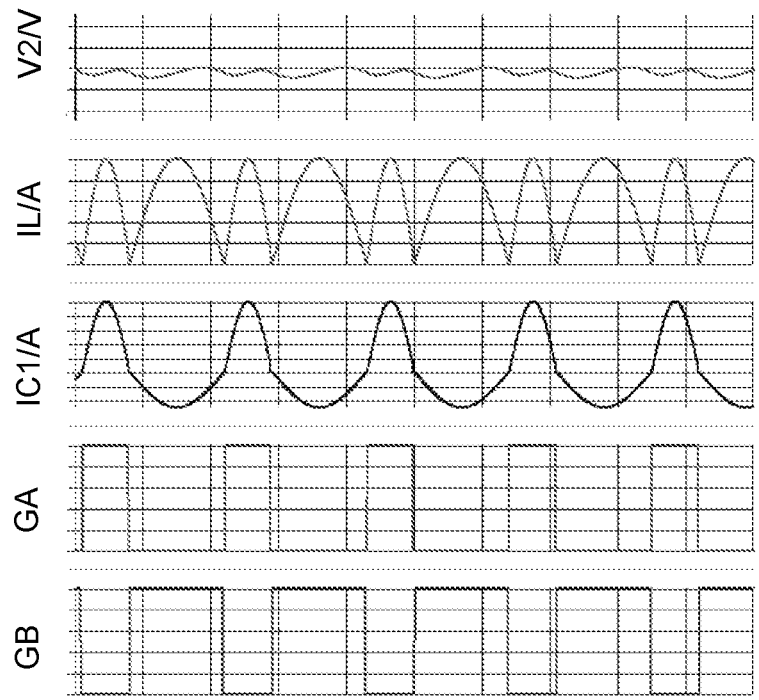
FIG. 2B illustrates waveform diagrams of relevant signals involved in the operation of the switched capacitor voltage converter circuit of FIG. 2A.
Figure 2C:
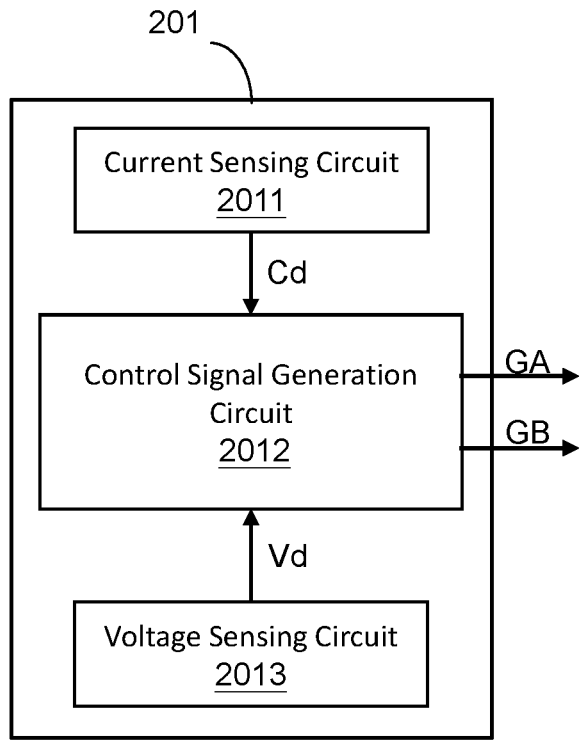
FIG. 2C shows a schematic block diagram of a control circuit in a switched capacitor voltage converter circuit according to an embodiment of the present invention.

Please refer to FIG. 2B, which illustrates waveform diagrams of relevant signals involved in the operation of the switched capacitor voltage converter circuit of FIG. 2A. The second voltage V2, a second current, an inductor current IL, a capacitor current IC1, a drain-source voltage Vds1 of the switch Q1, a drain-source voltage Vds1 of the switch Q6, the charging operation signal GA and the discharging operation signal GB are shown in FIG. 2B. As shown in FIG. 2B, in the resonant operation mode, the charge operating signal GA and the at least one discharge operating signal GB have respective conduction periods which do not overlap with each other, so that the charge process and the at least one discharge process do not overlap with each other Please refer to FIG. 2C, which shows a schematic block diagram of a control circuit in a switched capacitor voltage converter circuit according to an embodiment of the present invention. Please refer to FIG. 2C in conjunction with FIG. 2A. The control circuit 201 includes: a current sensing circuit 2011, a control signal generation circuit 2012 and a voltage sensing circuit 2013. The current sensing circuit 2011 is configured to operably sense a current flowing through the at least one inductor L, to generate at least one current sensing signal Cd. The control signal generation circuit 2012 is coupled to the current sensing circuit 2011. The control signal generation circuit 2012 is configured to operably generate the control signal (such as the charging operation signal GA and the discharging operation signal GB). The voltage sensing circuit 2013 is configured to operably sense the second voltage V2, to generate a voltage sensing signal Vd. It should be noted that, in a different embodiment, the control circuit 201 can determine the charge operating signal GA and the discharge operating signal GB only according to the voltage conversion ratio of the first voltage V1 and the second voltage V2, and control the switched capacitor converter 202 in an open-loop manner, in contrast to the embodiment shown in FIG. 2C wherein the control signals such as the charge operating signal GA and the discharge operating signal GB are generated according to the current sensing signal Cd and the switched capacitor converter 202 is controlled in a closed-loop feedback manner.

Figure 3A:
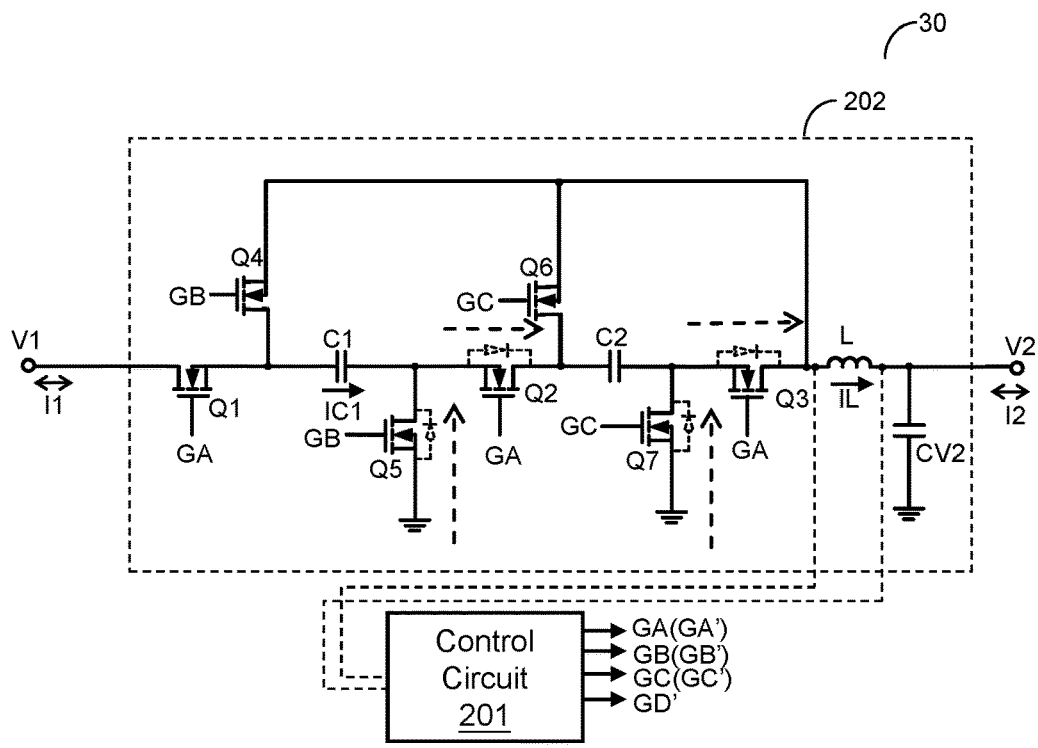
FIG. 3A shows a schematic circuit diagram of a switched capacitor voltage converter circuit according to another embodiment of the present invention.

FIG. 3A is a schematic circuit diagram showing a switched capacitor voltage converter circuit according to another embodiment of the present invention. In the present embodiment, the switched capacitor converter 202 operates in the first conversion mode of alternating discharging. The difference between the present embodiment and the embodiment of FIG. 2A is that, during at least one discharge process of the first conversion mode of alternating discharging in the present embodiment, the discharge operating signals GB and GC respectively control the switches Q4 and Q5 and the switches Q6 and Q7, so that each of the capacitors C1 and C2 is connected with the inductor L in series between the second voltage V2 and the DC potential (in the present embodiment, the DC potential is the ground potential) in turn, thereby alternatively forming plural discharging paths and operating in resonant operation.

Figure 3B:
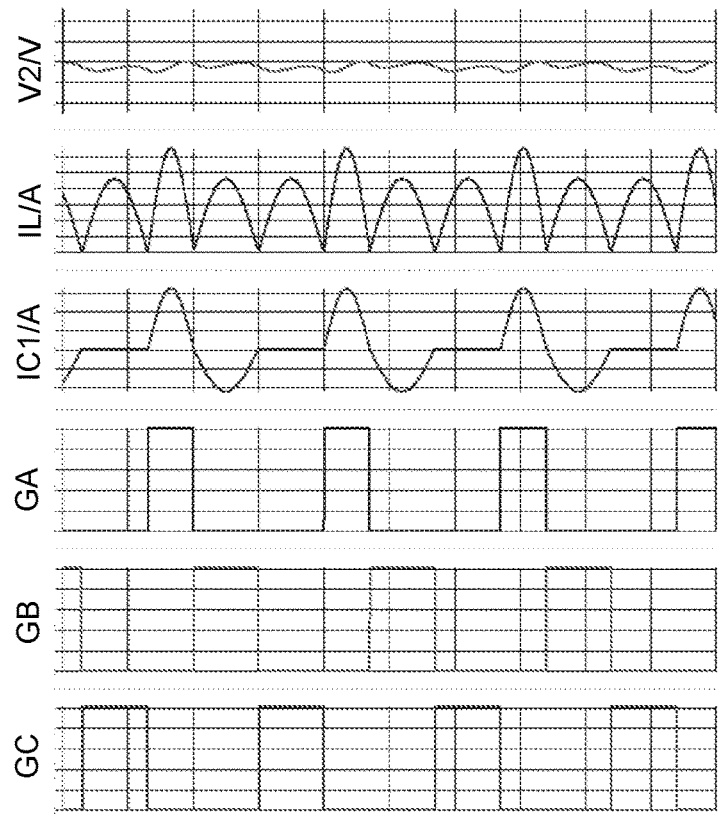
FIG. 3B illustrates waveform diagrams of relevant signals involved in the operation of the switched capacitor voltage converter circuit of FIG. 3A.
Figure 4A:
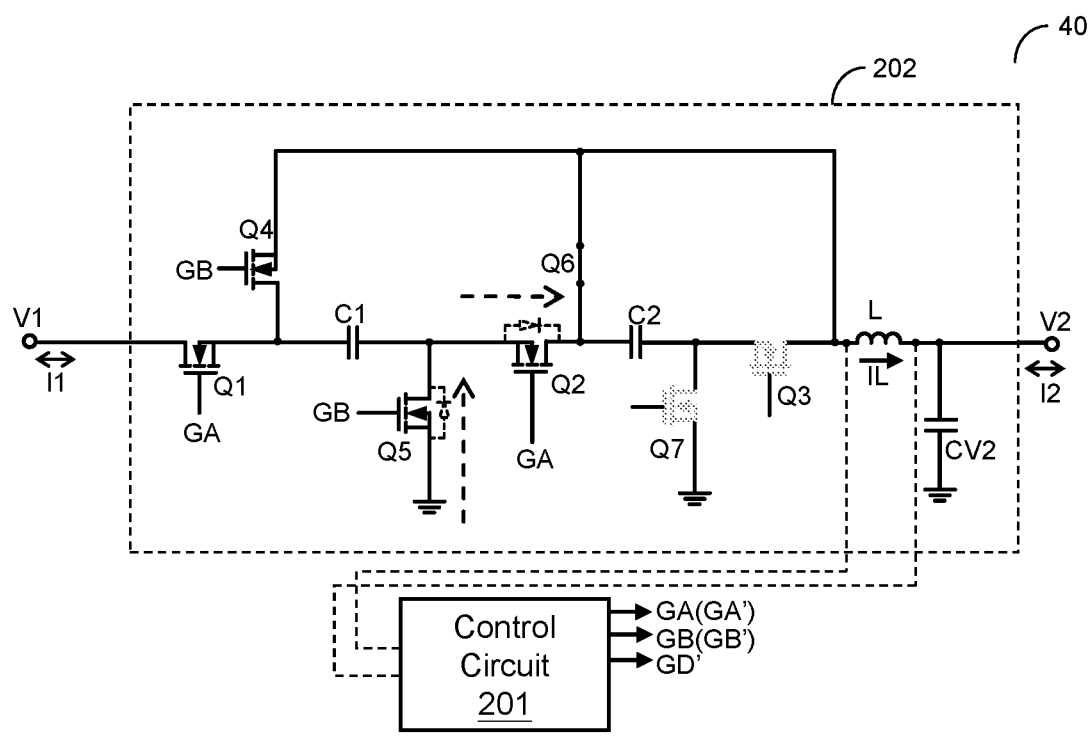
FIG. 4A is a schematic circuit diagram showing a switched capacitor voltage converter circuit according to yet another embodiment of the present invention.

FIG. 3B is a schematic diagram showing signal waveforms of relevant signals of a switched capacitor voltage converter circuit according to an embodiment of the present invention. The second voltage V2, the inductor current IL, the capacitor current IC1, the charge operating signal GA, the discharge operating signal GB, and the discharge operating signal GC are shown in FIG. 3B. As shown in FIG. 3B, in the first conversion mode of alternating discharging, the charge operating signal GA, the discharge operating signal GB, and the discharge operating signal GC have respective conduction periods which do not overlap with each other, so that the charge process and the at least one discharge process do not overlap with each other FIG. 4A is a schematic circuit diagram showing a switched capacitor voltage converter circuit according to yet another embodiment of the present invention. The embodiment of FIG. 4A is similar to the embodiment of FIG. 2A, but is different in that, in the present embodiment, the switch Q6 is always turned on, and the switches Q3 and Q7 are always turned off, so that the switched capacitor converter 202 operates in the second conversion mode, wherein the voltage conversion ratio of the first voltage V1 and the second voltage V2 is 2:1. During the charge process of the second conversion mode, the charge operating signal GA controls the switches Q1 and Q2, so that at least one capacitor C1 and the inductor L are connected in series between the first voltage V1 and the second voltage V2 to form a charging path and operate in resonant operation. During at least one discharge process of the second conversion mode, the discharge operating signal GB controls the switches Q4 and Q5, so that the capacitor C1 and the inductor L are connected in series between the second voltage V2 and the DC potential to form a discharging path and operate in resonant operation.

Figure 4B:
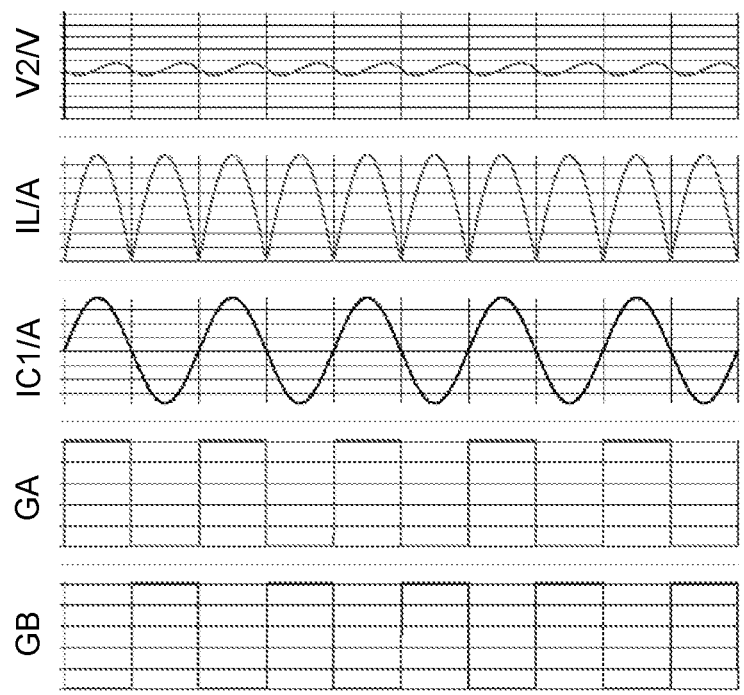
FIG. 4B is a schematic diagram showing signal waveforms of relevant signals of a switched capacitor voltage converter circuit according to an embodiment of the present invention.

FIG. 4B is a schematic diagram showing signal waveforms of relevant signals of a switched capacitor voltage converter circuit according to an embodiment of the present invention. The second voltage V2, the inductor current IL, the capacitor current IC1, the charge operating signal GA, and the discharge operating signal GB are shown in FIG. 4B. As shown in FIG. 4B, in the second conversion mode, the charge operating signal GA and the discharge operating signal GB have respective conduction periods which do not overlap with each other, so that the charge process and the discharge process do not overlap with each other.

Figures 5A, 5B:
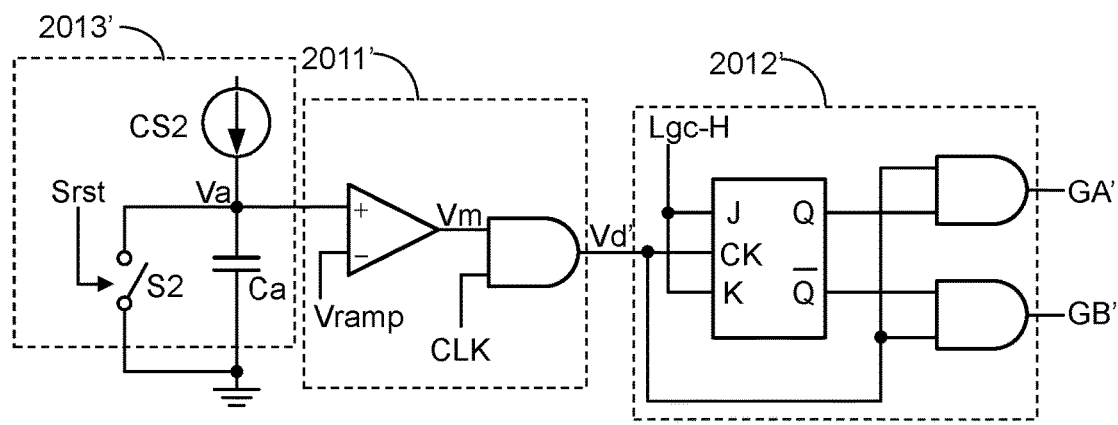
FIG. 5A shows a list of switch states of a switched capacitor voltage converter circuit during a mode switching period according to an embodiment of the present invention.
FIG. 5B is a schematic diagram showing a control circuit of a switched capacitor voltage converter circuit according to an embodiment of the present invention.

FIG. 5A shows a list of switch states during a mode switching period of a switched capacitor voltage converter circuit according to an embodiment of the present invention. Referring to the left side of FIG. 5A, during a mode switching period wherein the control circuit 201 is switched from a present conversion mode, such as the second conversion mode, to a next conversion mode, such as the first conversion mode of alternating discharging, the control signal is changed to a mode switching control signal that includes the mode-switching charge signal GA', the mode-switching discharge signals GB' and GC', and a unidirectional conduction signal GD'. The unidirectional conduction signal GD' is configured to control the forward switches Q2, Q3, Q5, and Q7 of the plural switches Q1-Q7 to operate in a unidirectional conduction mode. In the unidirectional conduction mode, each of the forward switches Q2, Q3, Q5, and Q7 provides a current channel that unidirectionally flows forward toward the second voltage V2, as indicated by the dashed arrows with shown in FIG. 4A and FIG. 3A. Meanwhile, the mode-switching charge signal GA' and the mode-switching discharge signals GB' and GC' control the switches other than the forward switches Q2, Q3, Q5, and Q7 operating in the unidirectional conduction mode, namely the switches Q1, Q4, and Q6, so as to convert the first voltage V1 into the second voltage V2.

The mode-switching charge signal GA' and the mode-switching discharge signals GB' and GC' operate similarly to the charge operating signal GA and the discharge operating signals GB and GC. In the charge process during the mode switching period, the mode-switching charge signal GA' controls the switch Q1, and the current channels of the switches Q2 and Q3 are forwardly conducted toward the second voltage V2, so that the capacitors C1 and C2 and the inductor L are connected in series between the first voltage V1 and the second voltage V2 to form a charging path but not necessarily in resonant operation. In at least one discharge process during the mode switching period, the mode-switching discharge signals GB' and GC' control the switches Q4 and Q6, and the current channels of the switches Q5 and Q7 are forwardly conducted toward the second voltage V2, so that each of the capacitors C1 and C2 is connected with the inductor L in series between the second voltage V2 and the DC potential (in the present embodiment, the DC potential is the ground potential) to alternately form plural discharging paths but do not necessarily operate in resonant operation. During the mode switching period, the charge process of the mode switching period and at least one discharge process of the mode switching period are performed repeatedly and alternately, to convert the first voltage V1 into the second voltage V2. During the mode switching period, the mode-switching charge signal GA' and the mode-switching discharge signals GB' and GC' have respective conduction periods which do not overlap with each other, so that the charge process in the mode switching period and the at least one discharge process in the mode switching period do not overlap with each other.

Please still refer to FIG. 5A. In one embodiment, at least two forward switches (such as but not limited to switches Q2, Q3, Q5, and Q7) of the plural switches Q1-Q7, whose body diodes provide unidirectional current channels toward the second voltage, operate in the unidirectional conduction mode; whereas, the other switches (such as but not limited to switches Q1, Q4, and Q6), whose body diodes are not used to provide unidirectional current channels toward the second voltage, are controlled by the mode-switching charge signal GA' and the mode-switching discharge signals GB' and GC'. In the unidirectional conduction mode, there are at least two forward switches having body diodes that provide current channels toward the second voltage V2, such as but not limited to the switches Q2, Q3, Q5, and Q7. During the mode switching period, the switches Q2, Q3, Q5 and Q7 are either always turned on, or always turned off but having body diodes providing unidirectional current channels toward the second voltage V2.

Meanwhile, the mode-switching charge signal GA' and the mode-switching discharge signals GB' and GC' control the switches Q1, Q4, and Q6 in a way similarly to how the charge operating signal GA and the discharge operating signal GB control the plural switches Q1-Q7.

Please refer to the right side of FIG. 5A. During a mode switching period wherein the control circuit 201 is switched from a present conversion mode, such as the first conversion mode of alternating discharging, to a next conversion mode, such as the second conversion mode, the control signal is changed to the mode switching control signal that includes the mode-switching charge signal GA', the mode-switching discharge signals GB' and GC', and the unidirectional conduction signal GD'. The unidirectional conduction signal GD' is configured to control the forward switches Q2, Q3, Q5, and Q7 of the plural switches Q1-Q7 to operate in the unidirectional conduction mode. In the unidirectional conduction mode, each of the forward switches Q2, Q3, Q5, and Q7 provides a current channel that flows forward toward the second voltage V2. Meanwhile, the mode-switching charge signal GA' and the mode-switching discharge signals GB' control the other switches Q1, Q4, and Q6 (mode-switching charging signal GA' controls the switches Q1, Q6, and the mode-switching discharge signal GB' controls the switch Q4), so as to convert the first voltage V1 into the second voltage V2.

In one embodiment, during the mode switching period, the control circuit 201 can control a duty cycle of the mode-switching charge signal GA' and/or duty cycles of the mode-switching discharge signals GB' and GC' to be correspondingly less than a duty cycle of a previous charge operating signal GA and/or previous discharge operating signals GB and GC, and the duty cycle of the mode-switching charge signal GA' and/or the mode-switching discharge signals GB' and GC' gradually increases from a preset value, so that the capacitor voltage across the corresponding capacitors C1 and/or C2 gradually increases or decreases during the mode switching period, and the change speed of the inductor current IL flowing through the inductor L is limited. In one embodiment, after the control circuit 201 sets the duty cycle of the mode-switching charge signal GA' and/or the duty cycles of the mode-switching discharge signals GB' and GC' to the preset value, the control circuit 201 gradually increases the duty cycle of the mode-switching charging signal GA' and/or the mode-switching discharging signal GB', until the switching cycle period of the mode-switching charging signal GA' and/or the mode-switching discharging signals GB' and GC' correspond to a resonant frequency of the next conversion mode operated by the switched capacitor converter 202. In one embodiment, after the switched capacitor converter 202 is switched from the first conversion mode to the second conversion mode or from the second conversion mode to the first conversion mode, when the second voltage V2 reaches the preset voltage of the second conversion mode or the first conversion mode for a preset period, the at least two forward switches (such as but not limited to switches Q2, Q3, Q5, and Q7) of the plural switches Q1-Q7, whose body diodes provide current channels toward the second voltage V2, are changed to be controlled by the charge operating signal GA and/or the discharge operating signal GB.

In one embodiment, during the mode switching period, the control circuit 201 can set the duty cycle of the mode-switching charge signal GA' and/or the duty cycles of the mode-switching discharge signals GB' and GC' to a preset value and increase the duty cycles gradually, such that when the at least two forward switches (such as but not limited to switches Q2, Q3, Q5, and Q7) are always turned on, or are always turned off but their body diodes provide current channels toward the second voltage V2, the inductor current IL flowing through the inductor L is freewheeling through at least one forward conducting current channel, whereby the inductor current IL flowing toward the second voltage V2 is in a specific state. In one embodiment, the aforementioned specific state is that the inductor current IL flowing toward the second voltage V2 is a non-resonant current. In a preferred embodiment, the aforementioned specific state is that the inductor current IL flowing toward the second voltage V2 is a linear ramp current.

For example, referring to FIG. 5A, and FIGS. 3A and 4A, during the mode switching period, the control circuit 201 sets the duty cycle of the mode-switching charge signal GA' and/or the duty cycles of the mode-switching discharge signals GB' and GC' to a preset value and increases the duty cycles gradually, so that when the at least two forward switches (such as but not limited to switches Q2, Q3, Q5, and Q7) are kept always off, one end of the inductor L is conducted to the DC potential through the body diodes of the at least two forward switches (for example, the forward switches Q3 and Q7, and/or the forward switches Q2 and Q5), and the inductor current IL flowing toward the second voltage V2 is a linear ramp current.

In an alternative embodiment, during the mode switching period, the control circuit 201 sets the duty cycle of the mode-switching charge signal GA' and/or the duty cycles of the mode-switching discharge signals GB' and GC' to a preset value and increases the duty cycles gradually, so that when the at least two forward switches (such as but not limited to switches Q2, Q3, Q5, and Q7) are kept always on, one end of the inductor L is conducted to the DC potential through the at least two forward switches (for example, the forward switches Q3 and Q7, and/or the forward switches Q2 and Q5) that are kept always on, and the inductor current IL flowing toward the second voltage V2 is a linear ramp current.

Figure 5C:
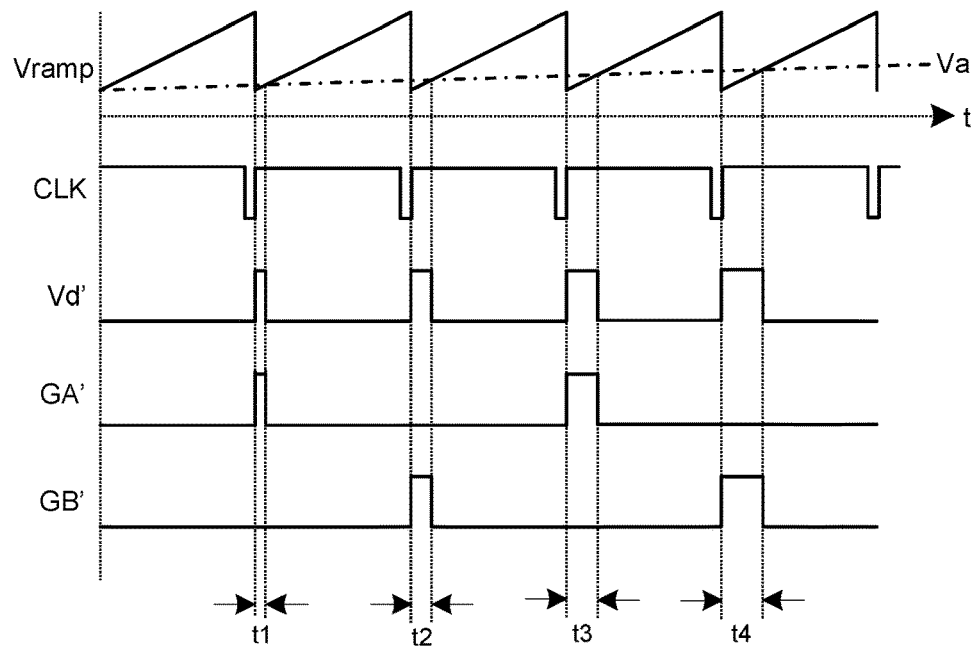
FIG. 5C is a schematic diagram showing signal waveforms of relevant signals of a control circuit of a switched capacitor voltage converter circuit during a mode switching period according to an embodiment of the present invention.

FIG. 5B is a schematic diagram showing a control circuit of a switched capacitor voltage converter circuit according to an embodiment of the present invention. The present embodiment shows a more specific configuration of the control circuit 201, as an example but not for limiting the broadest scope of the present invention. As shown in FIG. 5B, in one embodiment, the control circuit 201 includes a duty cycle determination circuit 2011', a duty cycle distribution circuit 2012', and a ramp-up voltage generating circuit 2013'. The duty cycle determination circuit 2011' is configured to compare a ramp-up voltage Va generated by the ramp-up voltage generating circuit 2013' at a ramp-up node between a current source CS2 and a capacitor Ca with a periodic waveform signal Vramp to generate a duty cycle signal Vd'. The periodic waveform signal Vramp is, for example, but not limited to, a triangular wave as shown in FIG. 5C. The duty cycle distribution circuit 2012' is configured to generate the mode-switching charge signal GA' and the mode-switching discharge signals GB' and GC' according to the duty cycle signal Vd'. In one embodiment, as shown in FIG. 5B, the duty cycle determination circuit 2011' includes a comparator and a logic AND gate; the duty cycle distribution circuit 2012' includes a flip-flop and a logic AND gate; the ramp-up voltage generating circuit 2013' includes a current source CS2, a capacitor Ca, and a reset switch S2.

During the mode switching period, the current source CS2 of the ramp-up voltage generating circuit 2013' charges the capacitor Ca, whereby the ramp-up voltage Va at the ramp-up node gradually increases. As the duty cycle determination circuit 2011' compares the ramp-up voltage Va with the periodic waveform signal Vramp, the duty of the duty cycle signal Vd' gradually increases, and the duty cycles of the mode-switching charge signal GA' and the mode-switching discharge signals GB' and GC' also gradually increase, so that when the first voltage V1 is converted into the second voltage V2 or the second voltage V2 is converted into the first voltage V1, the inrush current can be reduced.

In one embodiment, when the ramp-up voltage Va rises beyond a maximum value of the periodic waveform signal Vramp, the mode-switching charging signal GA' and the mode-switching discharging signals GB' and GC' generated by the duty cycle distribution circuit 2012' according to the duty cycle signal Vd' can directly enter the first conversion mode of alternating discharging or the second conversion mode. In one embodiment, after entering the first conversion mode of alternating discharging or the second conversion mode, the duty cycle distribution circuit 2012' can be turned off, and the charge operating signal GA and at least one discharge operating signal GB are generated by another circuit. In addition, the ramp-up voltage generating circuit 2013' can turn on the reset switch S2 at an appropriate time point (e.g., before the next mode switching period starts) according to the reset signal Srst, to discharge the capacitor Ca and to reset the ramp-up voltage Va.

FIG. 5C is a schematic diagram showing signal waveforms of relevant signals of a control circuit of a switched capacitor voltage converter circuit during a mode switching period according to an embodiment of the present invention. The ramp-up voltage Va of the ramp-up node, the periodic waveform signal Vramp, the clock signal CLK, the duty cycle signal Vd', the mode-switching charge signal GA', and the mode-switching discharge signal GB' are shown in FIG. 5C. As shown in FIG. 5C, the ramp-up voltage Va of the ramp-up node gradually increases during the mode switching period. As shown in FIG. 5C, during the mode switching period, the time lengths of the conduction periods t1 to t4 gradually increase. In one embodiment, the duty cycle gradually increases from a preset value to 50%.

Figure 5D:
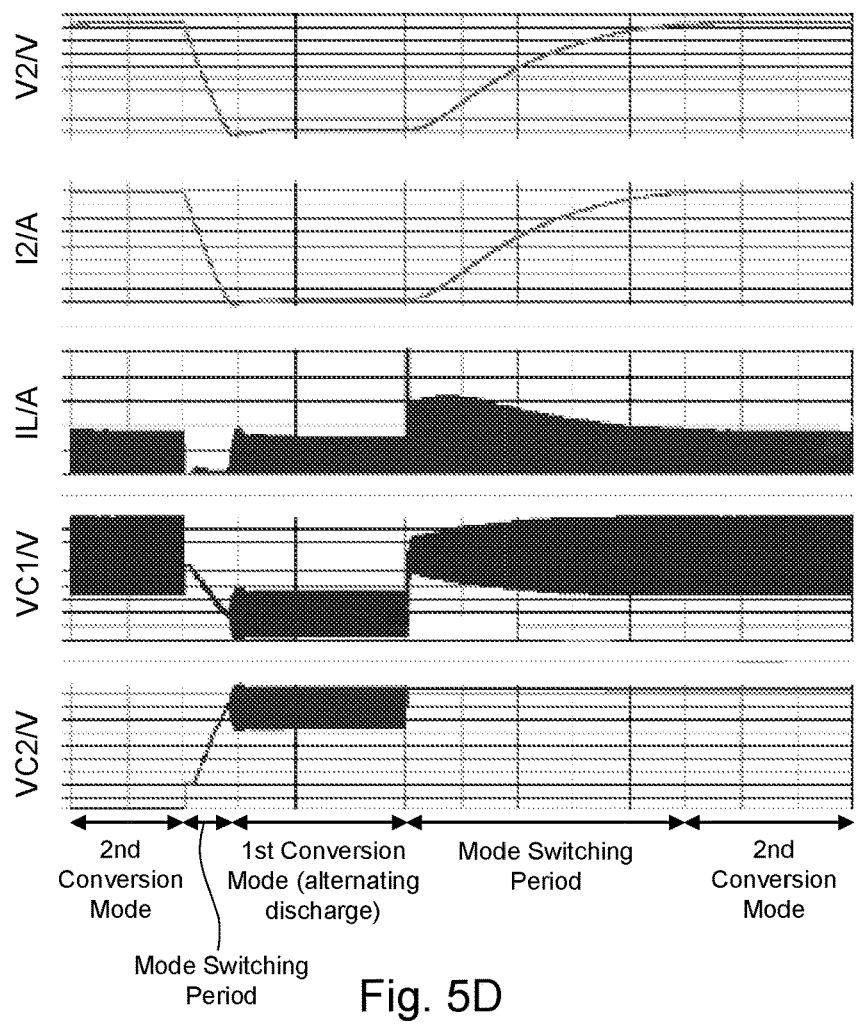
FIG. 5D is a schematic diagram showing signal waveforms of relevant signals of a switched capacitor voltage converter circuit according to an embodiment of the present invention.
Figure 5E:
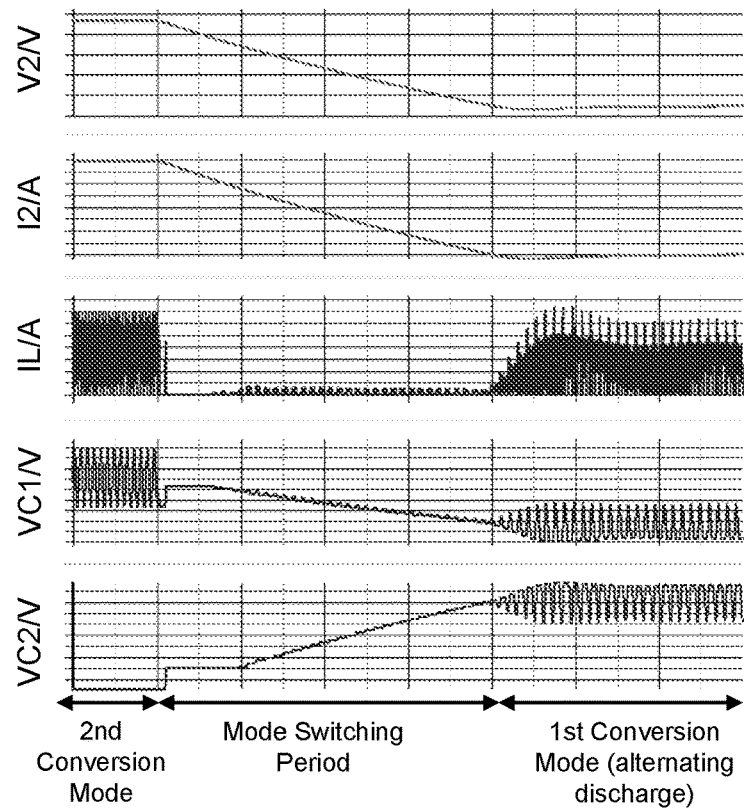
FIG. 5E is a partial enlarged view of switching from a second conversion mode to a first conversion mode (alternating) in FIG. 5D.
Figure 5F:
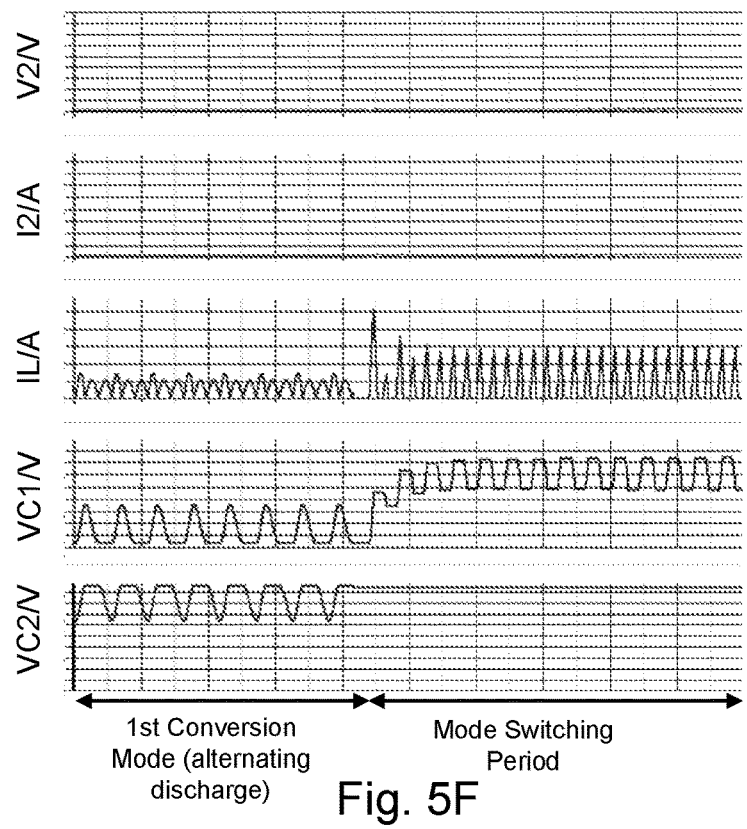
FIG. 5F is a partial enlarged view of switching from a first conversion mode (alternating) to a second conversion mode in FIG. 5D.

FIG. 5D is a schematic diagram showing signal waveforms of relevant signals of a switched capacitor voltage converter circuit according to an embodiment of the present invention. FIG. 5E is a partial enlarged view of relevant signals of switching from the second conversion mode to the first conversion mode of alternating discharging during the mode switching period in FIG. 5D. FIG. 5F is a partial enlarged view of switching from the first conversion mode of alternating discharging to the second conversion mode in FIG. 5D. The second voltage V2, the second current I2, the inductor current IL, the capacitor voltage VC1, and the capacitor voltage VC2 are shown in FIGS. 5D, 5E, and 5F. It can be seen from FIGS. 5D, 5E, and 5F that the switched capacitor voltage converter circuit can further reduce the inrush current by gradually increasing the duration of the conduction period during the mode switching period.

Figures 6A, 6B:
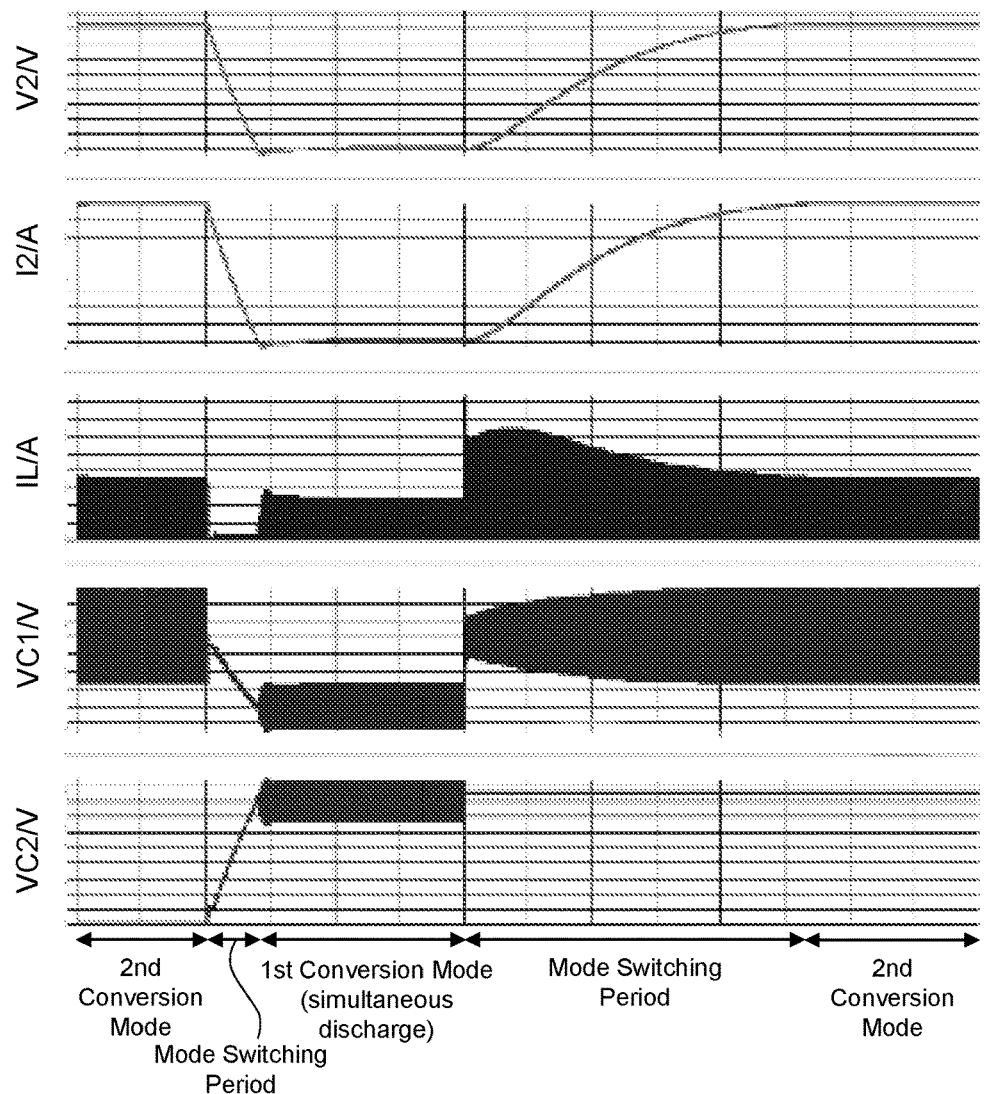
FIG. 6A shows a list of switch states of a switched capacitor voltage converter circuit during a mode switching period according to another embodiment of the present invention.
FIG. 6B is a schematic diagram showing signal waveforms of relevant signals of a switched capacitor voltage converter circuit according to an embodiment of the present invention.

FIG. 6A shows a list of switch states during a mode switching period of a switched capacitor voltage converter circuit according to another embodiment of the present invention. Referring to the left side of FIG. 6A, during a mode switching period wherein the control circuit 201 is switched from a present conversion mode, such as the second conversion mode, to a next conversion mode, such as the first conversion mode of simultaneous discharging, the control signal is changed to the mode switching control signal that includes the mode-switching charge signal GA', the mode-switching discharge signal GB', and the unidirectional conduction signal GD'. The unidirectional conduction signal GD' is configured to control the forward switches Q2, Q3, Q5, and Q7 of the plural switches Q1-Q7 to operate in the unidirectional conduction mode. In the unidirectional conduction mode, each of the forward switches Q2, Q3, Q5, and Q7 provides a current channel that flows toward the second voltage V2. Meanwhile, the mode-switching charge signal GA' and the mode-switching discharge signals GB' control the switches Q1, Q4, and Q6, so as to convert the first voltage V1 into the second voltage V2.

Please still to refer to FIG. 6A. In one embodiment, at least two forward switches (such as but not limited to the switches Q2, Q3, Q5 and Q7) of the plural switches, whose body diodes provide current channels toward the second voltage V2, are operated in the unidirectional conduction mode, and the switches (such as but not limited to switches Q1, Q4, Q6) other than at least two forward switches are controlled by the mode-switching charge signal GA' or the mode-switching discharge signal GB'. In the unidirectional conduction mode, the at least two forward switches whose body diodes provide current channels toward the second voltage V2 are always turned on, or always turned off but the current can flow through their body diodes toward the second voltage V2.

Please refer to the right side of FIG. 6A, during a mode switching period wherein the control circuit 201 is switched from a present conversion mode, such as the first conversion mode of simultaneous discharging, to a next conversion mode, such as the second conversion mode, the control signal is changed to the mode switching control signal that includes the mode-switching charge signal GA', the mode-switching discharge signal GB', and the unidirectional conduction signal GD'. The unidirectional conduction signal GD' is configured to control the forward switches Q2, Q3, Q5, and Q7 of the plural switches Q1-Q7 to operate in the unidirectional conduction mode. In the unidirectional conduction mode, each of the forward switches Q2, Q3, Q5, and Q7 provides a current channel that flows toward the second voltage V2. Meanwhile, the mode-switching charge signal GA' and the mode-switching discharge signals GB' control the switches Q1, Q4, and Q6 (mode-switching charging signal GA' controls the switches Q1 and Q6, and the mode-switching discharge signal GB' controls the switch Q4), so as to convert the first voltage V1 into the second voltage V2.

In one embodiment, during the mode switching period, the control circuit 201 can control the duty cycle of the mode-switching charge signal GA' and/or the mode-switching discharge signals GB' and GC' to be correspondingly less than the duty cycle of the previous charge operating signal GA and/or previous discharge operating signals GB and GC, and the duty cycle of the mode-switching charge signal GA' and/or the mode-switching discharge signals GB' and GC' gradually increases from a preset value, so that a capacitor voltage across the corresponding capacitors C1 and/or C2 gradually increases or decreases during the mode switching period, and the change speed of the inductor current IL flowing through the inductor L is limited. In one embodiment, after the control circuit 201 sets the duty cycle of the mode-switching charge signal GA' and/or the mode-switching discharge signals GB' and GC' to the preset value, the control circuit 201 gradually increases the duty cycle of the mode-switching charging signal GA' and/or the mode-switching discharging signal GB' until the switching cycle period of the mode-switching charging signal GA' and/or the mode-switching discharging signals GB' and GC' corresponds to a resonant frequency of the next conversion mode operated by the switched capacitor converter 202. In one embodiment, after the switched capacitor converter 202 is switched from the first conversion mode to the second conversion mode or from the second conversion mode to the first conversion mode, when the second voltage V2 reaches the preset voltage of the second conversion mode or the first conversion mode for a preset period, the at least two forward switches (such as but not limited to the switches Q2, Q3, Q5 and Q7) of the plural switches Q1-Q7, whose body diodes provide current channels toward the second voltage V2, are changed to be controlled by the charge operating signal GA and/or the discharge operating signal GB.

In one embodiment, during the mode switching period, the control circuit 201 can set the duty cycle of the mode-switching charge signal GA' and/or the mode-switching discharge signals GB' and GC' to a preset value and increases the duty cycle gradually, whereby when the at least two forward switches (such as but not limited to switches Q2, Q3, Q5 and Q7) are always turned on, or always turned off but their body diodes provide current channels toward the second voltage V2, the inductor current IL flowing through the inductor L is freewheeling through at least one forward conducting current channel, so that the inductor current IL flowing toward the second voltage V2 is in a specific state. In one embodiment, the aforementioned specific state is that the inductor current IL flowing toward the second voltage V2 is a non-resonant current. In a preferred embodiment, the aforementioned specific state is that the inductor current IL flowing toward the second voltage V2 is a linear ramp current.

For example, please refer to FIG. 6A and FIGS. 2A and 4A simultaneously, during the mode switching period, the control circuit 201 sets the duty cycle of the mode-switching charge signal GA' and/or the mode-switching discharge signals GB' and GC' to a preset value and increases the duty cycle gradually, so that when the at least two forward switches (such as but not limited to switches Q2, Q3, Q5 and Q7) are turned off, an end of the inductor L is conducted to the DC potential through the body diodes of the at least two forward switches (for example, the forward switches Q3 and Q7, and/or the forward switches Q2 and Q5), and the inductor current IL flowing toward the second voltage V2 is a linear ramp current.

In an alternative embodiment, during the mode switching period, the control circuit 201 sets the duty cycle of the mode-switching charge signal GA' and/or the mode-switching discharge signals GB' and GC' to a preset value and increases the duty cycle gradually, so that when the at least two forward switches (such as but not limited to switches Q2, Q3, Q5 and Q7) are always turned on, an end of the inductor L is conducted to the DC potential through the at least two forward switches (such as forward switches Q3 and Q7, and/or forward switches Q2 and Q5) that are always turned on, and the inductor current IL flowing toward the second voltage V2 is a linear ramp current.

FIG. 6B is a schematic diagram showing signal waveforms of relevant signals of a switched capacitor voltage converter circuit according to an embodiment of the present invention. The second voltage V2, the second current I2, the inductor current IL, the capacitor voltage VC1, and the capacitor voltage VC2 are shown in FIG. 6B. It can be seen from FIG. 6B that the switched capacitor voltage converter circuit can further reduce the inrush current by gradually increasing the duration of the conduction period during the mode switching period.

Figure 7:
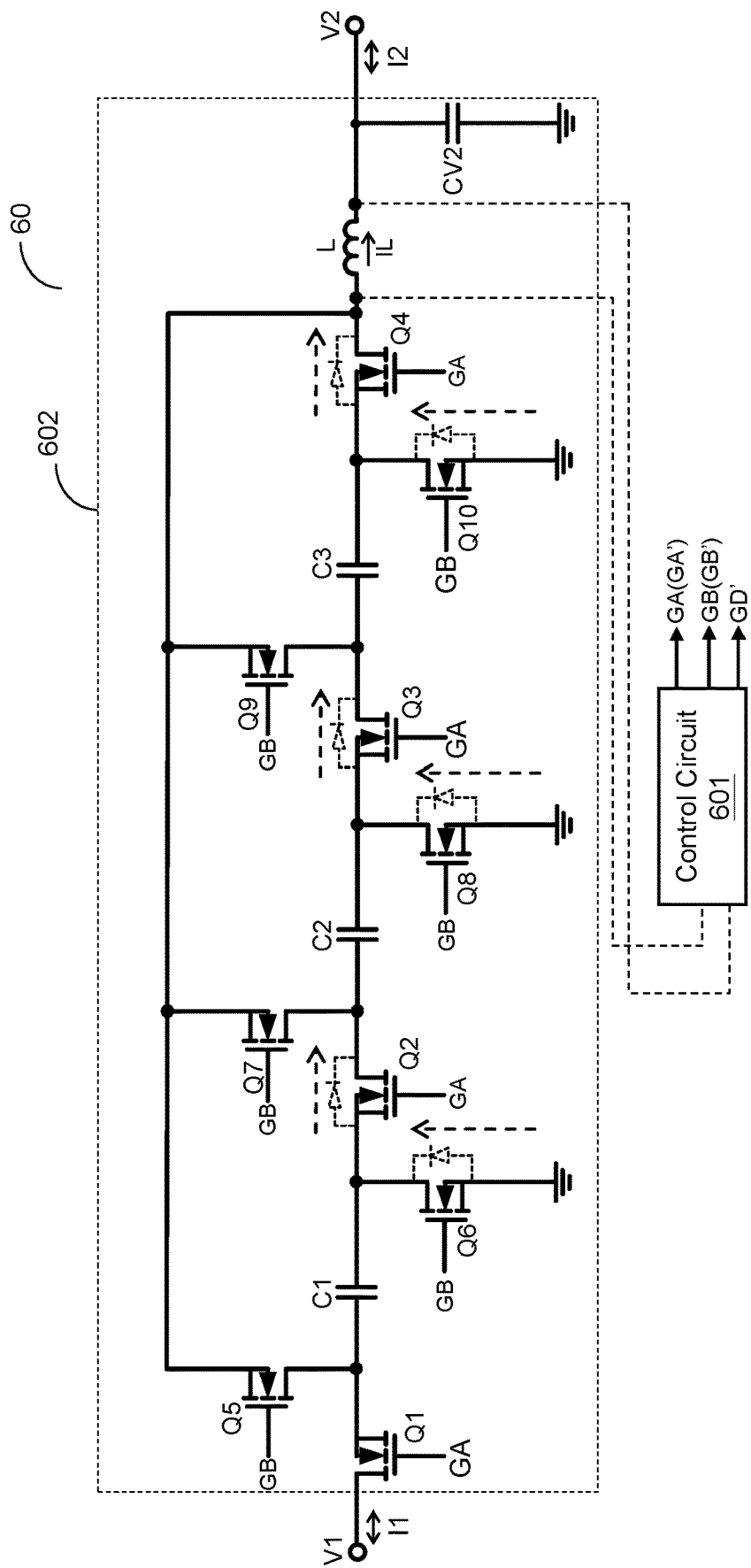
FIG. 7 is a schematic circuit diagram showing a switched capacitor voltage converter circuit according to yet another embodiment of the present invention.

FIG. 7 is a schematic circuit diagram showing a switched capacitor voltage converter circuit according to yet another embodiment of the present invention. As shown in FIG. 7, the switched capacitor converter 602 of the switched capacitor voltage converter circuit 60 of the present invention includes capacitors C1-C3, switches Q1-Q10, and an inductor L. The switches Q1-Q3 are connected in series with the corresponding capacitors C1-C3, respectively, and the switch Q4 is connected in series with the inductor L.

The switches Q1-Q10 can switch the electrical connection relationships among the capacitors C1-C3 and the inductor L according to the corresponding operation signals. In the charge process, according to the charge operating signal GA, the switches Q1-Q4 are turned on, and the switches Q5-Q10 are turned off, so that the capacitors C1-C3 are connected in series with each other, and the series circuit is connected in series with the inductor L between the first voltage V1 and the second voltage V2 to form a charging path. In the discharge process, according to the discharge operating signal GB, the switches Q5-Q10 are turned on, and the switches Q1-Q4 are turned off, so that the capacitors C1-C3 are connected in parallel with each other, and the parallel circuit is connected in series with the inductor L between the second voltage V2 and the ground potential to form plural discharging paths. It should be noted that the above-mentioned charge process and the above-mentioned discharge process are performed repeatedly and alternatively at different time periods, rather than simultaneously, to convert the first voltage V1 to the second voltage V2 or convert the second voltage V2 to the first voltage V1. In the present embodiment, the DC bias voltage of each of the capacitors C1-C3 is the second voltage V2, so the capacitors C1-C3 in the present embodiment only need to withstand a lower rated voltage, that is, the present invention can use capacitors with a lower rating.

The control circuit 601 and the operation mechanism of the present embodiment can be configured similarly to the control circuit and the operation mechanism of FIGS. 2A, 2C, 3A, 4A, 5A, and 6A; please refer to the detailed description with respect to FIGS. 2A, 2C, 3A, 4A, 5A, and 6A. The mechanism of the inductor current freewheeling during the mode switching period is similar to FIGS. 5A and 6A, via switches such as, but not limited to, Q2, Q3, Q4, Q6, Q8, and Q10; please refer to the detailed description with respect to FIGS. 5A and 6A.

Figure 8:
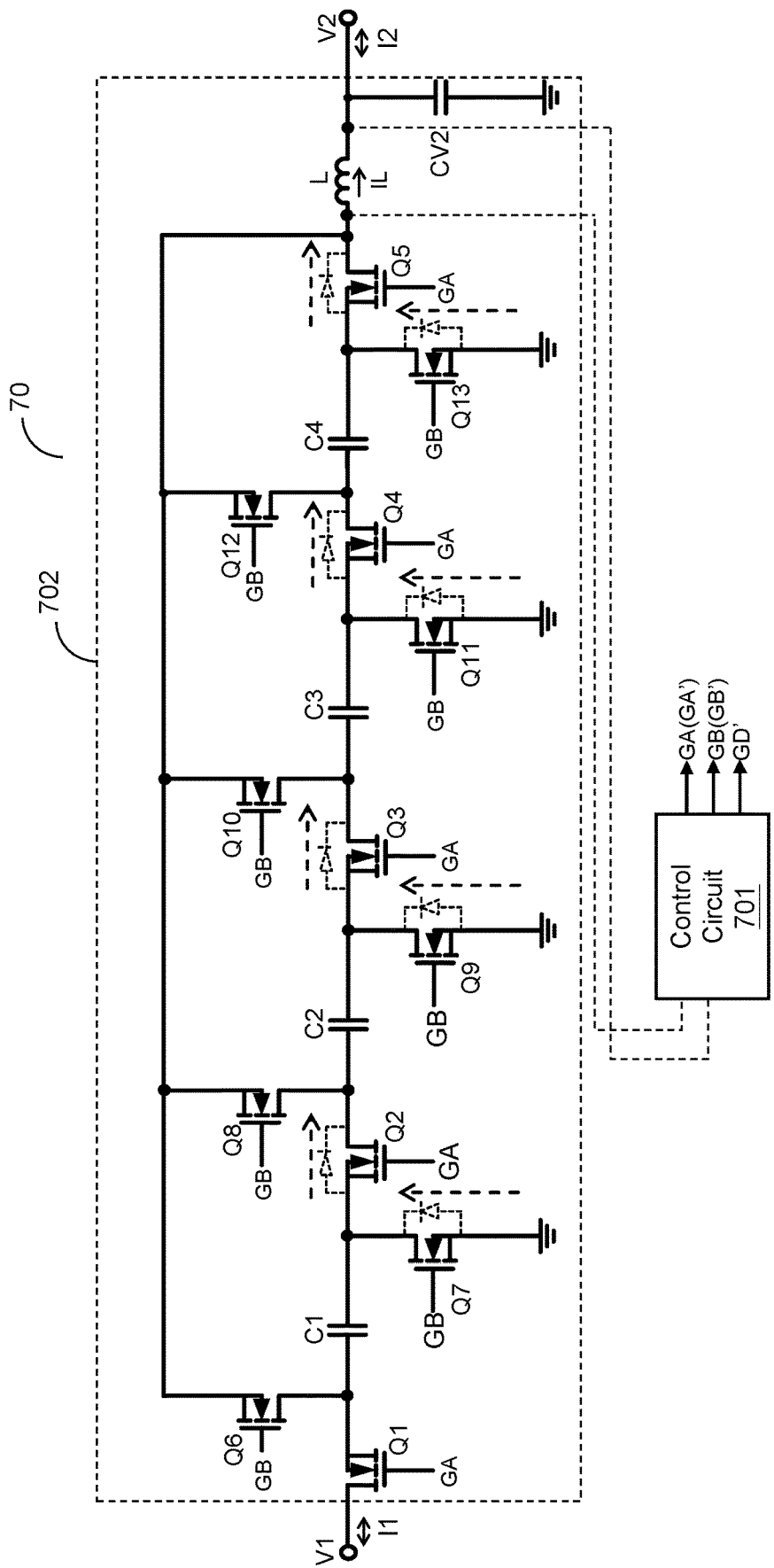
FIG. 8 is a schematic circuit diagram showing a switched capacitor voltage converter circuit according to yet another embodiment of the present invention.

FIG. 8 is a schematic circuit diagram showing a switched capacitor voltage converter circuit according to yet another embodiment of the present invention. As shown in FIG. 8, the switched capacitor converter 702 of the switched capacitor voltage converter circuit 70 of the present invention includes capacitors C1-C4, switches Q1-Q13, and an inductor L. The switches Q1-Q4 are connected in series with the corresponding capacitors C1-C4, respectively, and the switch Q5 is connected in series with the inductor L.

The switches Q1-Q13 can switch the electrical connection relationships among the capacitors C1-C4 and the inductor L according to the corresponding operation signals. During the charge process, according to the charge operating signal GA, the switches Q1-Q5 are turned on, and the switches Q6-Q13 are turned off, so that the capacitors C1-C4 are connected in series with each other and the series circuit is connected in series with the inductor L between the first voltage V1 and the second voltage V2 to form a charging path. In the discharge process, according to the discharge operating signal GB, the switches Q6-Q13 are turned on, and the switches Q1-Q5 are turned off, so that the capacitors C1-C4 are connected in parallel with each other, and the parallel circuit is connected in series with the inductor L between the second voltage V2 and the ground potential to form multiple discharging paths. It should be noted that the above-mentioned charge process and the above-mentioned discharge process are performed repeatedly and alternatively at different time periods, rather than simultaneously, to convert the first voltage V1 to the second voltage V2 or convert the second voltage V2 to the first voltage V1. In the present embodiment, the DC bias voltage of each of the capacitors C1-C4 is the second voltage V2, so the capacitors C1-C3 in the present embodiment only need to withstand a lower rated voltage, that is, the present invention can use capacitors with a lower rating.

The control circuit 701 and the operation mechanism of the present embodiment can be configured similarly to the control circuit and the operation mechanism of FIGS. 2A, 2C, 3A, 4A, 5A, and 6A; please refer to the detailed description with respect to FIGS. 2A, 2C, 3A, 4A, 5A, and 6A. The mechanism of the inductor current freewheeling during the mode switching period is similar to FIGS. 5A and 6A, via switches such as, but not limited to, Q2, Q3, Q4, Q5 and Q7, Q9, Q11, and Q13, please refer to the detailed description with respect to FIGS. 5A and 6A.

The present invention as described above provides a switched capacitor voltage converter circuit. Advantages of the present invention include: that, during mode switching period, by reducing the duty cycle to a preset value and gradually increasing the duty cycle, and the freewheeling of the inductor current during mode switching period, the inrush current generated during mode switching period can be effectively reduced; that, more operating modes with different voltage conversion ratios can be provided; that, the switching current can be limited during mode switching period; and that, during mode switching period, it is not required to stop or reset the switched capacitor converter.

In the above-mentioned embodiments, the circuit configured to convert the first voltage V1 into the second voltage V2 is also applicable to converting the second voltage V2 into the first voltage V1. In this case, the control circuit selects the ratio between the first voltage V1 and the second voltage V2 according to the level of the second voltage V2, and generates a control signal accordingly, to convert the second voltage V2 into the first voltage V1. To give a more specific example, in the above-mentioned embodiments, the control circuit 201 determines the switched capacitor converter 202 to operate in one of the second conversion mode, the first conversion mode of simultaneous discharging, and the first conversion mode of alternating discharging according to the first voltage V1. Similarly, the same circuit also can operate as: the control circuit 201 determines the switched capacitor converter 202 to operate in one of a one-to-two mode, a one-to-three mode of simultaneous discharging, and a one-to-three mode of alternating discharging according to the second voltage V2.

It should be noted that, in all the above embodiments, the switched capacitor voltage converter circuit has a bidirectional conversion function, that is, the switched capacitor voltage converter circuit is capable of performing bidirectional conversion wherein the switched capacitor voltage converter circuit can convert the first voltage V1 into the second voltage V2 or convert the second voltage V2 can be converted into the first voltage V1. When the switched capacitor voltage converter circuit is applied to converting the second voltage V2 into the first voltage V1, during the mode switching period, when the unidirectional conduction signal controls the forward switches of the plural switches to operate in the unidirectional conduction mode, each of the forward switches provides a current channel that unidirectionally flows forward toward the first voltage V1.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switched capacitor voltage converter circuit configured to convert a first voltage into a second voltage, the switched capacitor voltage converter circuit comprising:
   a switched capacitor converter, coupled between the first voltage and the second voltage; and
   a control circuit, configured to control the switched capacitor converter to operate in a conversion mode having a voltage conversion ratio, and configured to generate control signals according to the conversion mode to control the switched capacitor converter to convert the first voltage into the second voltage;
   wherein the switched capacitor converter comprises:
      at least two capacitors;
      a plurality of switches, coupled with the at least two capacitors; and
      at least one inductor;
   wherein the control signals comprise a charge operating signal and at least one discharge operating signal to control the plurality of switches to convert the first voltage into the second voltage;
   wherein during a charge process of the conversion mode, the charge operating signal controls the plurality of switches, so that at least one of the at least two capacitors and the at least one inductor are connected in series between the first voltage and the second voltage to form a charging path and operate in a resonant operation mode;
   wherein during at least one discharge process of the conversion mode, the at least one discharge operating signal controls the plurality of switches, so that the at least two capacitors and the at least one inductor are connected in series between the second voltage and a direct-current (DC) potential, to simultaneously or alternately form a plurality of discharging paths and operate in the resonant operation mode;

wherein in the conversion mode, the charge process and the at least one discharge process are performed repeatedly and alternately, so as to convert the first voltage into the second voltage;

wherein in the conversion mode, the charge operating signal and the at least one discharge operating signal have respective conduction periods which do not overlap with each other, so that the charge process and the at least one discharge process do not overlap with each other;

wherein during a mode switching period wherein the control circuit is switched from a present conversion mode to a next conversion mode, the control signals are changed to a mode switching control signal, which comprises a mode-switching charge signal, at least one mode-switching discharge signal, and a unidirectional conduction signal;

wherein the unidirectional conduction signal is configured to control at least two forward switches of the plurality of switches to operate in a unidirectional conduction mode, wherein during the unidirectional conduction mode, each of the at least two forward switches provides a current channel unidirectionally toward the second voltage;

wherein the mode-switching charge signal and the at least one mode-switching discharge signal control the switches other than the at least two forward switches operating in the unidirectional conduction mode, so as to convert the first voltage into the second voltage;

wherein the control circuit comprises:

a duty cycle determination circuit, configured to compare a ramp-up voltage of a ramp-up node with a periodic waveform signal to generate a duty cycle signal;

a duty cycle distribution circuit, configured to generate the mode-switching charge signal and the at least one mode-switching discharge signal according to the duty cycle signal; and a ramp-up voltage generating circuit, coupled to the duty cycle determination circuit, and configured to generate the ramp-up voltage of the ramp-up node during the mode switching period; and wherein the ramp-up voltage of the ramp-up node gradually increases during the mode switching period, so that the duty cycle of the mode-switching charge signal and the at least one mode-switching discharge signal gradually increases correspondingly.

2. The switched capacitor voltage converter circuit of claim 1, wherein the at least two forward switches operating in the unidirectional conduction mode are either always turned on, or always turned off but having body diodes providing the current channel unidirectionally toward the second voltage.

3. The switched capacitor voltage converter circuit of claim 1, wherein during the mode switching period, a duty cycle of the mode-switching charge signal or the at least one mode-switching discharge signal is correspondingly less than a duty cycle of a previous charge operating signal or a previous discharge operating signal, and the duty cycle of the mode-switching charge signal or the at least one mode-switching discharge signal gradually increases from a preset value, so that a capacitor voltage across the corresponding capacitor of the at least two capacitors gradually increases or decreases during the mode switching period.

4. The switched capacitor voltage converter circuit of claim 1, wherein the switched capacitor converter comprises a series-parallel switched capacitor converter.

5. The switched capacitor voltage converter circuit of claim 1, wherein the DC potential is a ground potential.

6. The switched capacitor voltage converter circuit of claim 1, wherein during the mode switching period, the control circuit reduces the duty cycle of the mode-switching charge signal or the at least one mode-switching discharge signal to a preset value to limit an inductor current flowing through the at least one inductor.

7. The switched capacitor voltage converter circuit of claim 6, wherein the conversion mode comprises a first conversion mode and a second conversion mode, and wherein after the control circuit reduces the duty cycle of the mode-switching charge signal or the at least one mode-switching discharge signal to the preset value, the control circuit gradually increases the duty cycle of the mode-switching charging signal or the at least one mode-switching discharging signal until a switching cycle period of the mode-switching charging signal or the at least one mode-switching discharging signal corresponds to a resonant frequency of the switched capacitor converter in the first conversion mode or in the second conversion mode.

8. The switched capacitor voltage converter circuit of claim 1, wherein the conversion mode comprises a first conversion mode and a second conversion mode, and wherein during the mode switching period, when the second voltage reaches a preset voltage of the second conversion mode or of the first conversion mode for a preset period, the at least two forward switches providing a current channel unidirectionally toward the second voltage are changed to be controlled by the charge operating signal or the at least one discharge operating signal.

9. The switched capacitor voltage converter circuit of claim 1, wherein the switched capacitor voltage converter circuit has a bidirectional conversion function, and wherein the switched capacitor voltage converter circuit is operable to convert the second voltage into the first voltage.

10. A switched capacitor voltage conversion method configured to convert a first voltage of a switched capacitor converter into a second voltage, the switched capacitor converter comprising at least two capacitors, a plurality of switches, and at least one inductor, the switched capacitor voltage conversion method comprising:

controlling the switched capacitor converter to operate in a conversion mode having a voltage conversion ratio, and generating control signals according to the conversion mode to control the plurality of switches of the switched capacitor converter to convert the first voltage into the second voltage, wherein the control signals comprise a charge operating signal and at least one discharge operating signal;

wherein during a charge process of the conversion mode, the charge operating signal controls the plurality of switches, so that at least one of the at least two capacitors and the at least one inductor are connected in series between the first voltage and the second voltage to form a charging path and operate in a resonant operation mode;

wherein during at least one discharge process of the conversion mode, the at least one discharge operating signal controls the plurality of switches, so that the at least two capacitors and the at least one inductor are connected in series between the second voltage and a direct-current (DC) potential, to simultaneously or alternately form a plurality of discharging paths and operate in the resonant operation mode;

wherein in the conversion mode, the charge process and the at least one discharge process are performed repeatedly and alternately, so as to convert the first voltage into the second voltage;

wherein in the conversion mode, the charge operating signal and the at least one discharge operating signal have respective conduction periods which do not overlap with each other, so that the charge process and the at least one discharge process do not overlap with each other;

wherein during a mode switching period between switching a present conversion mode to a next conversion mode, the control signals are changed to a mode switching control signal, which comprises a mode-switching charge signal, at least one mode-switching discharge signal, and a unidirectional conduction signal;

wherein the unidirectional conduction signal is configured to control at least two forward switches of the plurality of switches to operate in a unidirectional conduction mode, wherein during the unidirectional conduction mode, each of the at least two forward switches provides a current channel unidirectionally toward the second voltage;

wherein the mode-switching charge signal and the at least one mode-switching discharge signal control the switches other than the at least two forward switches operating in the unidirectional conduction mode, so as to convert the first voltage into the second voltage;

comparing a ramp-up voltage of a ramp-up node with a periodic waveform signal to generate a duty cycle signal;

generating the mode-switching charge signal and the at least one mode-switching discharge signal according to the duty cycle signal; and generating the ramp-up voltage of the ramp-up node during the mode switching period;

wherein the ramp-up voltage of the ramp-up node gradually increases during the mode switching period, so that the duty cycle of the mode-switching charge signal and the at least one mode-switching discharge signal gradually increases correspondingly.

11. The switched capacitor voltage conversion method of claim 10, wherein the at least two forward switches operating in the unidirectional conduction mode are either always turned on, or always turned off but having body diodes providing the current channel unidirectionally toward the second voltage.

12. The switched capacitor voltage conversion method of claim 10, further comprising:

adjusting a duty cycle of the mode-switching charge signal or the at least one mode-switching discharge signal to be correspondingly less than a duty cycle of a previous charge operating signal and/or a previous discharge operating signal during the mode switching period; and adjusting the duty cycle of the mode-switching charge signal or the at least one mode-switching discharge signal to gradually increase from a preset value, so that a capacitor voltage across the corresponding capacitor of the at least two capacitors gradually increases or decreases during the mode switching period.

13. The switched capacitor voltage conversion method of claim 10, wherein the switched capacitor converter comprises a series-parallel switched capacitor converter.

14. The switched capacitor voltage conversion method of claim 10, wherein the DC potential is a ground potential.

15. The switched capacitor voltage conversion method of claim 10, further comprising:

reducing the duty cycle of the mode-switching charge signal or the at least one mode-switching discharge signal to a preset value to limit an inductor current flowing through the at least one inductor during the mode switching period.

16. The switched capacitor voltage conversion method of claim 15, wherein the conversion mode comprises a first conversion mode and a second conversion mode, and the switched capacitor voltage conversion method further comprising:

after the duty cycle of the mode-switching charge signal or the at least one mode-switching discharge signal is reduced to the preset value, gradually increasing the duty cycle of the mode-switching charging signal or the at least one mode-switching discharging signal until a switching cycle period of the mode-switching charging signal or the at least one mode-switching discharging signal corresponds to a resonant frequency of the switched capacitor converter in the first conversion mode or in the second conversion mode.

17. The switched capacitor voltage conversion method of claim 10, wherein the conversion mode comprises a first conversion mode and a second conversion mode, and after switching from the first conversion mode to the second conversion mode or from the second conversion mode to the first conversion mode, when the second voltage reaches a preset voltage of the second conversion mode or of the first conversion mode for a preset period, the at least two forward switches of the plurality of switches providing a current channel unidirectionally toward the second voltage are changed to be controlled by the charge operating signal or the at least one discharge operating signal.

* * * * *